United States Patent
Kobayashi et al.

(10) Patent No.: US 10,536,084 B2
(45) Date of Patent: Jan. 14, 2020

(54) POWER SUPPLY APPARATUS AND IMAGE FORMING APPARATUS

(71) Applicant: CANON KABUSHIKI KAISHA, Tokyo (JP)

(72) Inventors: Junya Kobayashi, Suntou-gun (JP); Yasuhiro Shimura, Yokohama (JP); Jun Kawakatsu, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/872,197

(22) Filed: Jan. 16, 2018

(65) Prior Publication Data
US 2018/0212508 A1  Jul. 26, 2018

(30) Foreign Application Priority Data

Jan. 20, 2017 (JP) ................................ 2017-008737

(51) Int. Cl.
| | |
|---|---|
| H02M 3/335 | (2006.01) |
| H02M 1/14 | (2006.01) |
| G03G 15/16 | (2006.01) |
| G03G 15/00 | (2006.01) |
| H02M 1/00 | (2006.01) |

(52) U.S. Cl.
CPC ........ H02M 3/33523 (2013.01); G03G 15/16 (2013.01); G03G 15/80 (2013.01); H02M 1/14 (2013.01); H02M 3/33576 (2013.01); *H02M 2001/0025* (2013.01)

(58) Field of Classification Search
CPC ......... H02M 5/257; H02M 2001/0032; H02M 2001/0048; H02M 2001/322; H02M 3/33507; H02M 3/33523; H02M 1/08; H02M 1/14; H02M 2001/0009; H02M 2001/0025; G05F 15/80; Y02B 70/1491; Y02B 70/16

See application file for complete search history.

(56) References Cited

U.S. PATENT DOCUMENTS

| | | | |
|---|---|---|---|
| 6,853,174 B1 * | 2/2005 | Inn .................... | H02M 3/1588 323/284 |
| 9,118,244 B2 | 8/2015 | Shigetomi | |
| 9,627,988 B2 * | 4/2017 | Lee .................... | H02M 3/3376 |
| 9,787,205 B2 | 10/2017 | Kobayashi et al. | |
| 9,823,617 B2 | 11/2017 | Shimura et al. | |
| 9,897,964 B2 | 2/2018 | Shimura | |
| 2013/0141948 A1 * | 6/2013 | Bailey ............... | H02M 3/33523 363/21.16 |
| 2013/0301311 A1 * | 11/2013 | Wang ................ | H02M 3/33515 363/21.13 |
| 2015/0115921 A1 * | 4/2015 | Yang ................. | H02M 3/33523 323/282 |

(Continued)

FOREIGN PATENT DOCUMENTS

| | | |
|---|---|---|
| JP | 2014-128093 A | 7/2014 |
| JP | 5826158 A | 12/2015 |

*Primary Examiner* — Gustavo A Rosario-Benitez
(74) *Attorney, Agent, or Firm* — Venable LLP

(57) ABSTRACT

The power supply apparatus, when a switching element is driven at a second frequency lower than a first frequency, determines a duty of a pulse signal according to a predetermined voltage so that a frequency of the pulse signal input to a feedback unit is equal to or more than a predetermined frequency.

9 Claims, 10 Drawing Sheets

(56) References Cited

U.S. PATENT DOCUMENTS

| | | | |
|---|---|---|---|
| 2016/0141966 A1* | 5/2016 | Huang | H02M 3/33523 |
| | | | 363/21.15 |
| 2016/0352232 A1* | 12/2016 | Chang | G06F 1/266 |
| 2016/0359419 A1* | 12/2016 | Lin | H02M 1/08 |
| 2017/0005585 A1 | 1/2017 | Shimura et al. | |
| 2017/0155335 A1* | 6/2017 | Chang | H02M 1/08 |
| 2017/0176918 A1 | 6/2017 | Shimura et al. | |
| 2017/0199491 A1 | 7/2017 | Kawakatsu | |
| 2018/0041027 A1* | 2/2018 | Matsuda | H02M 3/28 |

\* cited by examiner

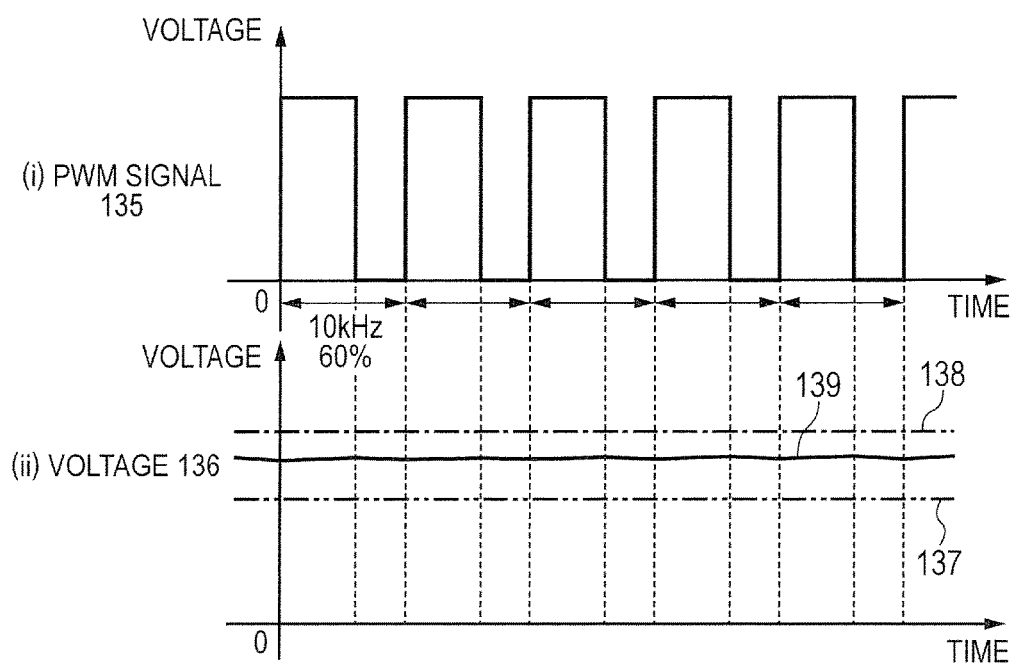

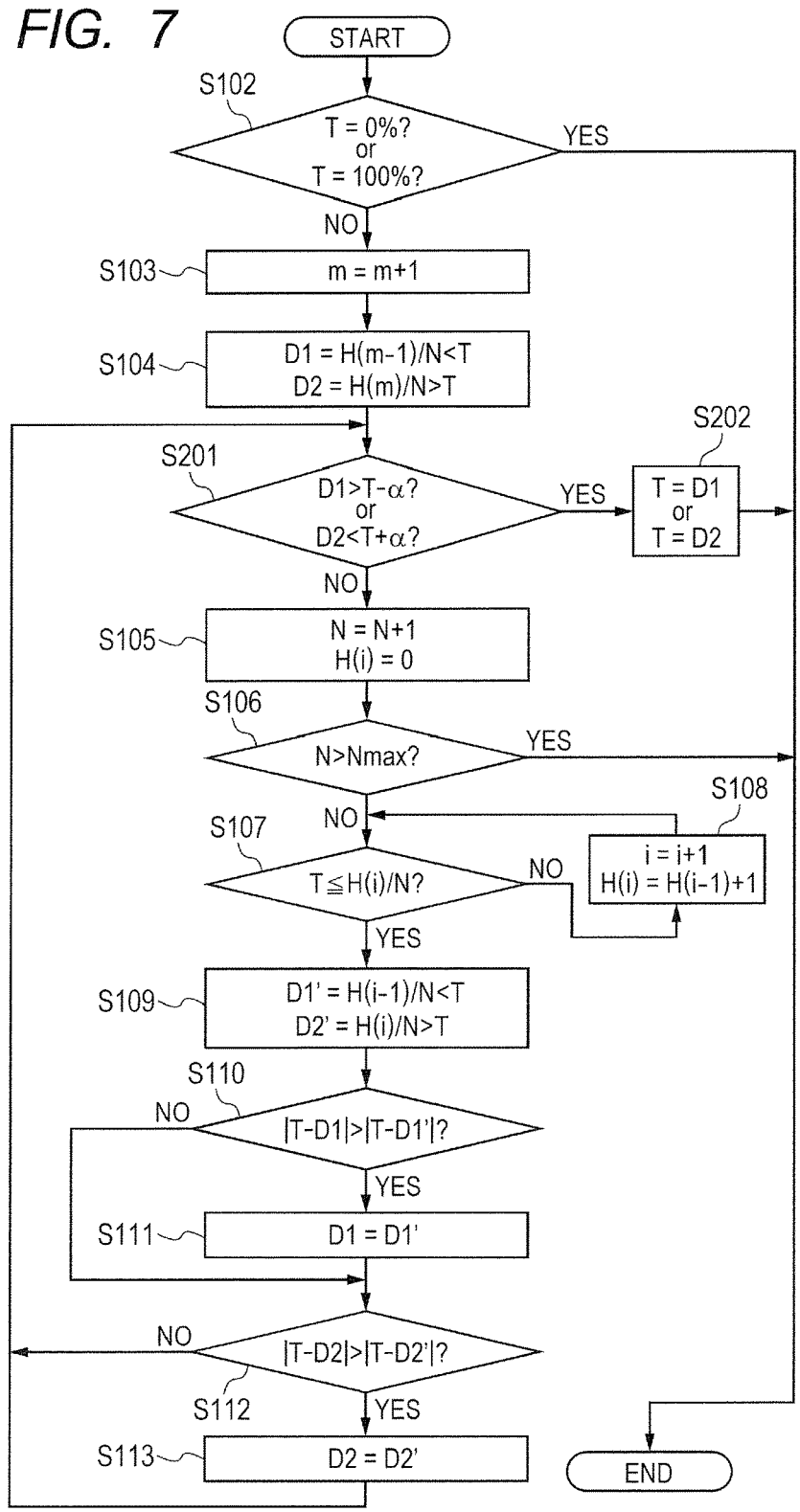

POWER SUPPLY APPARATUS AND IMAGE FORMING APPARATUS

BACKGROUND OF THE INVENTION

Field of the Invention

The present invention relates to a power supply apparatus configured to control a DC voltage to be output based on information fed back from an output DC voltage, and an image forming apparatus including the power supply apparatus.

Description of the Related Art

There have hitherto been an AC/DC converter configured to receive an AC voltage and output a DC voltage and a DC/DC converter configured to receive a DC voltage and output a DC voltage different from the input DC voltage. In such AC/DC converter and DC/DC converter, a DC voltage to be output varies among converters due to a variation in component configured to determine an output DC voltage. Therefore, for example, in order to reduce a difference among converters in DC voltage to be output, a DC voltage to be output is appropriately adjusted. For example, in Japanese Patent No. 5826158, there is disclosed a technology of adjusting a DC voltage to be output by inputting a signal to a feedback voltage.

A processor configured to output a PWM signal for adjusting a DC voltage to be output generates a PWM signal, for example, through use of a timer function based on a reference clock. Further, some processors set the frequency of a reference clock of the processor at the time of a power saving mode to be lower than that at the time of a normal mode. When the PWM signal at the time of the power saving mode has the same duty resolution as that at the time of the normal mode, because the frequency of the PWM signal at the time of the power saving mode is lower than that at the time of the normal mode, a ripple of a DC voltage to be output increases. Further, when the PWM signal at the time of the power saving mode has the same frequency as that at the time of the normal mode, the duty resolution of the PWM signal decreases, and there is a risk in that the DC voltage to be output may not be satisfactorily adjusted.

SUMMARY OF THE INVENTION

An aspect of the present invention is a power supply apparatus capable of adjusting a duty of a PWM signal while reducing a ripple of an output voltage when a drive frequency of a switching element is lower than that at the time of a normal mode.

Another aspect of the present invention is a power supply apparatus including a transformer having a primary winding and a secondary winding, a switching element connected to the primary winding of the transformer, the driven switching element configured to intermittently supply a current to the primary winding, a feedback unit configured to output a feedback signal according to an output voltage output from the secondary winding of the transformer, a control unit configured to control a driven state of the switching element based on the feedback signal output from the feedback unit, a generation unit configured to generate a clock signal for driving the switching element at one of a first frequency and a second frequency lower than the first frequency, an output unit configured to output a pulse signal having a duty at which the output voltage reaches a predetermined voltage to the feedback unit based on the clock signal generated by the generation unit, and a determining unit configured to determine the duty of the pulse signal according to the predetermined voltage so that a frequency of the pulse signal is equal to or more than a predetermined frequency when the switching element is driven at the second frequency.

A further aspect of the present invention is an image forming apparatus including:@@ an image forming unit, which is configured to form an image on a recording material; and a power supply apparatus, which is configured to supply electric power to the image forming apparatus, the power supply apparatus including: a transformer, which includes a primary winding and a secondary winding; a switching element, which is connected to the primary winding of the transformer, and is driven so as to intermittently supply a current to the primary winding; a feedback unit, which is configured to output a feedback signal in accordance with an output voltage output from the secondary winding of the transformer; a control unit, which is configured to control a driven state of the switching element based on the feedback signal output from the feedback unit; a generation unit, which is configured to generate a clock signal for driving the switching element at one of a first frequency and a second frequency lower than the first frequency; an output unit, which is configured to output a pulse signal having a duty at which the output voltage reaches a predetermined voltage to the feedback unit based on the clock signal generated by the generation unit; and a determining unit, which is configured to determine the duty of the pulse signal in accordance with the predetermined voltage so that a frequency of the pulse signal is equal to or more than a predetermined frequency when the switching element is driven at the second frequency.

Further features of the present invention will become apparent from the following description of exemplary embodiments with reference to the attached drawings.

BRIEF DESCRIPTION OF THE DRAWINGS

FIG. 3 is a graph for showing waveforms of a PWM signal and a voltage in the first embodiment.

FIG. 7 is a flowchart for illustrating determining processing of a duty of a PWM signal in a third embodiment of the present invention.

DESCRIPTION OF THE EMBODIMENTS

Now, modes for carrying out the present invention are described in detail by way of embodiments with reference to the drawings.

In a first embodiment of the present invention, description is given of an example of an AC/DC converter configured to output a DC voltage from a commercial AC voltage.

(Configuration and Operation of Power Supply Apparatus 100)

Figure 1:
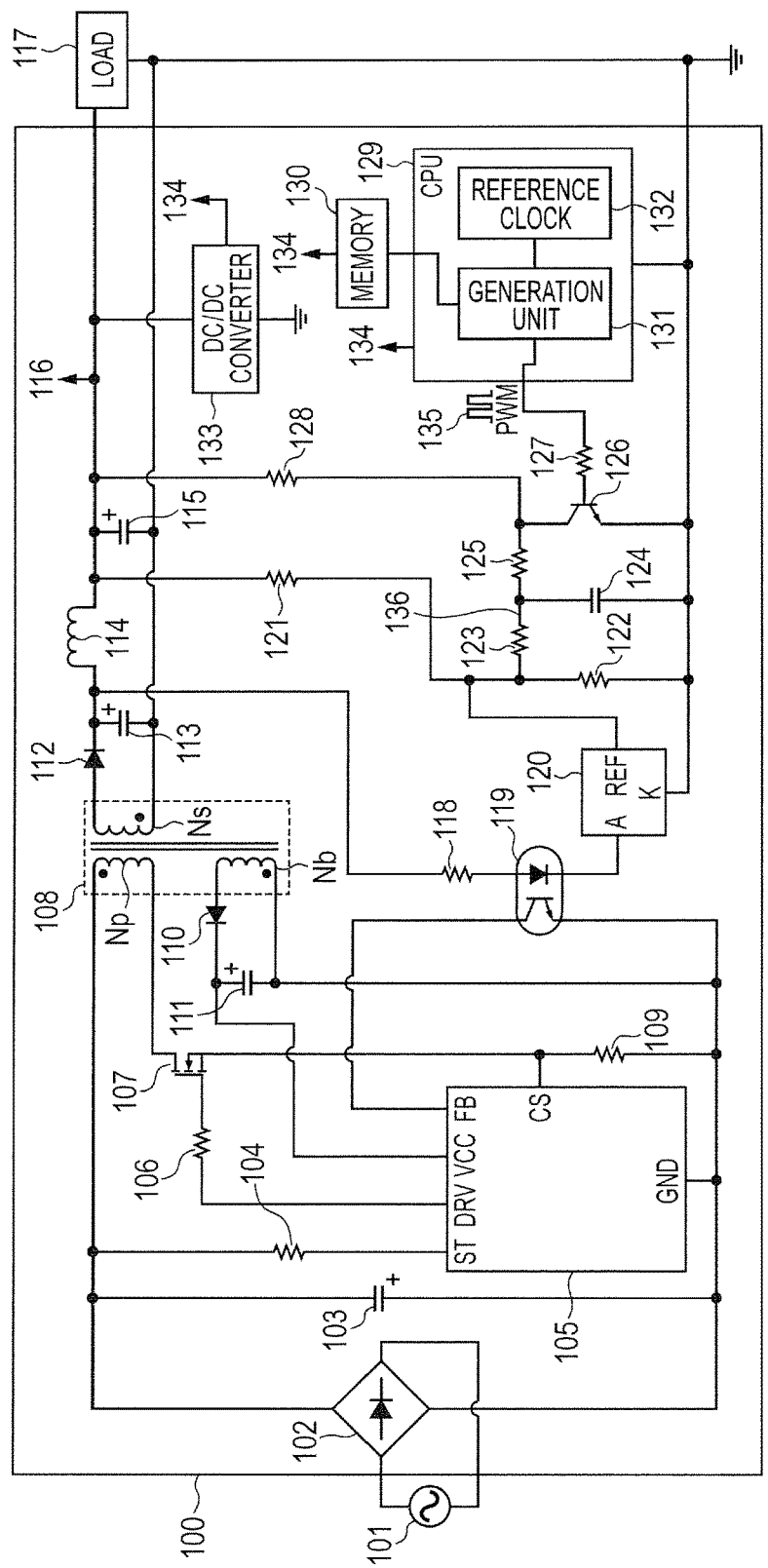
FIG. 1 is a circuit diagram of a power supply apparatus 100 of a first embodiment of the present invention.

A circuit of a power supply apparatus 100 of the first embodiment is illustrated in FIG. 1. The power supply apparatus 100 is configured to receive an AC voltage from an AC power supply 101 and supply an output DC voltage (hereinafter sometimes referred to as "output voltage") 116 to a load 117. The AC voltage input from the AC power supply 101 is subjected to full-wave rectification by a rectifier diode bridge 102 to be charged as a DC voltage to a primary smoothing capacitor (hereinafter referred to as "capacitor") 103. Further, the DC voltage charged to the capacitor 103 is input to an ST terminal of a power supply IC 105 being a control unit through a start-up resistor 104. When a current is thus supplied to the power supply IC 105, and the power supply IC 105 is charged up to a predetermined voltage, the power supply IC 105 is activated.

When the power supply IC 105 is activated, a signal at a high level is output from a DRV terminal to bring a field effect transistor (hereinafter referred to as "FET") 107 into a conductive state through a resistor 106. When the FET 107 is brought into the conductive state, the DC voltage charged to the capacitor 103 is applied to a primary winding Np of a transformer 108. The transformer 108 includes the primary winding Np, a secondary winding Ns, and an auxiliary winding Nb. The primary winding Np and the secondary winding Ns have opposite polarities, and the primary winding Np and the auxiliary winding Nb have opposite polarities. When the DC voltage is applied to the primary winding Np, a voltage is induced also to the secondary winding Ns. However, the induced voltage is a voltage that is negative on an anode side of a diode 112, and hence the voltage is not transmitted to the secondary side. Similarly, a voltage is induced also to the auxiliary winding Nb. However, the induced voltage is a voltage that is negative on an anode side of a diode 110, and hence a current does not flow through the auxiliary winding Nb. Thus, a current flowing through the primary winding Np is only an excitation current of the transformer 108, and energy that is proportional to the square of the excitation current is accumulated in the transformer 108. This excitation current increases in proportion to time.

Next, when the output from the DRV terminal of the power supply IC 105 reaches a low level, the FET 107 is brought into a non-conductive state from the conductive state. When the FET 107 is brought into the non-conductive state, a voltage having a polarity opposite to that at the time of conduction of the FET 107 is induced to each winding of the transformer 108. With this, a voltage that is positive on the anode side of the diode 112 is induced to the secondary winding Ns, and the diode 112 is brought into the conductive state. The energy accumulated in the transformer 108 is rectified and smoothed through the diode 112, a smoothing capacitor 113, a coil 114, and a smoothing capacitor 115 to be supplied to the load 117 as the output voltage 116. A voltage that is positive on the anode side of the diode 110 is induced to the auxiliary winding Nb through switching of the FET 107. With this, a capacitor 111 is charged through the diode 110, and the voltage of the capacitor 111 is input to a VCC terminal of the power supply IC 105 to be supplied as electric power for continuing the operation of the power supply IC 105. The FET 107 being a switching element is turned on so as to supply a current to the transformer 108 or turned off so as to interrupt supply of a current.

(Control of Output Voltage at time when PWM Signal Is not Output)

The control of the output voltage 116 is performed as follows. Description is given of a case in which a PWM signal 135 is not output, that is, a case in which the PWM signal 135 is at a 100% low level in FIG. 1. The PWM signal 135 is output to a resistor 127 by a generation unit 131 included in a CPU 129. The output voltage 116 is divided with a combined resistor including resistors 121, 123, 125, and 128, and a resistor 122, and the divided voltage (hereinafter referred to as "$V_{REF}$") is input to an REF terminal of a shunt regulator 120. The shunt regulator 120 generates a feedback signal in accordance with the level of the input voltage $V_{REF}$, and the feedback signal is fed back from a terminal A to the power supply IC 105 on the primary side through a photocoupler 119. A transistor 126, the resistors 121, 122, 123, 125, and 128, and the shunt regulator 120 serve as a feedback unit. The shunt regulator 120 outputs the feedback signal in accordance with the output voltage 116 output from the secondary winding Ns of the transformer 108 to the primary side.

A resistor 118 is a resistor for limiting a current flowing through the photocoupler 119. The power supply IC 105 stably controls the output voltage 116 by performing switching control of the FET 107 based on the feedback signal. The names of terminals of the power supply IC 105 are illustrated in the power supply IC 105 in FIG. 1.

The configuration and operation of the power supply IC 105 are described. When the DC voltage input through the ST terminal of the power supply IC 105 reaches the predetermined voltage, the power supply IC 105 is activated. When the power supply IC 105 is activated, the power supply IC 105 is driven thereafter with a DC voltage input from the capacitor 111 through the VCC terminal. A feedback (FB) terminal of the power supply IC 105 is a terminal for receiving the feedback signal indicating a fluctuation of the output voltage 116 through the photocoupler 119. A CS terminal of the power supply IC 105 is a terminal for monitoring a current flowing through a drain terminal of the FET 107 and receiving a voltage generated between both ends of a current detection resistor 109. Further, when the voltage input to the CS terminal of the power supply IC 105 exceeds the predetermined voltage, the power supply IC 105 stops the switching operation of the FET 107. The power supply IC 105 also includes a ground (GND) terminal.

(Adjustment Range of Output Voltage with PWM Signal)

Figure 2A:
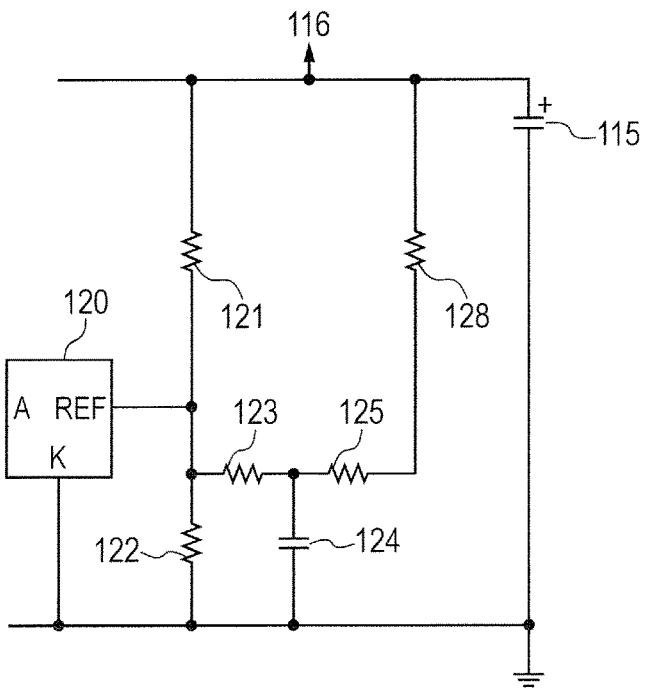
FIG. 2A is a circuit diagram of a periphery of an output voltage at a time when a transistor is in an ON state in the first embodiment.
Figure 2B:
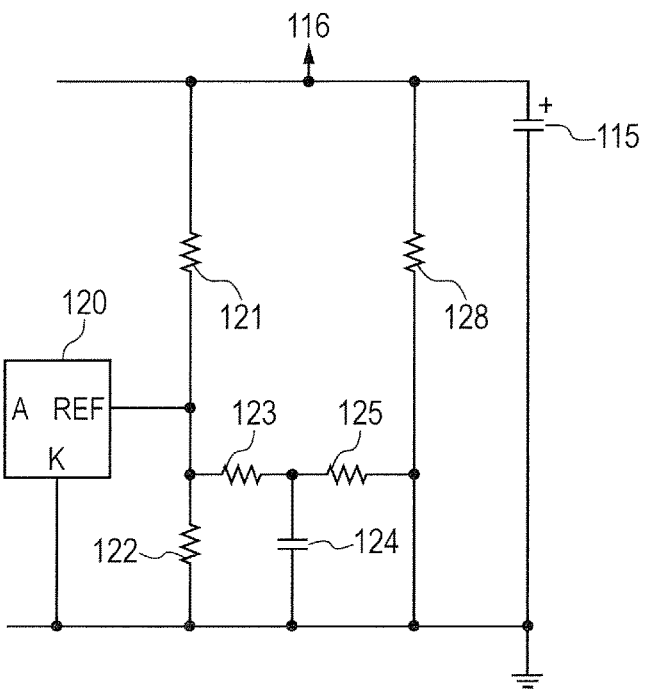
FIG. 2B is a circuit diagram of the periphery of the output voltage at a time when the transistor is in an OFF state in the first embodiment.

Description is given of the adjustment range of the output voltage 116 at a time when the duty of the PWM signal 135 changes from 0% to 100% with reference to FIG. 2A and FIG. 2B. The duty of the PWM signal 135 is a ratio of a turn-on width of the PWM signal 135 with respect to a period of the PWM signal 135, and is hereinafter sometimes referred to as "ON duty". FIG. 2A is a circuit diagram of a periphery of the output voltage 116 at a time when the transistor 126 is in the non-conductive state in FIG. 1. The transistor 126 is brought into the non-conductive state when the PWM signal 135 is at a 100% low level. In this case, as described above, the voltage obtained by dividing the output voltage 116 with the combined resistor including the resistors 121, 123, 125, and 128, and the resistor 122 is fed back to control the output voltage 116. Resistance values of the resistor 121, the resistor 122, the resistor 123, the resistor 125, and the resistor 128 are represented by $R_{121}$, $R_{122}$, $R_{123}$, $R_{125}$, and $R_{128}$, respectively. A combined resistance value of the resistor 121, the resistor 123, the resistor 125, and the resistor 128 is represented by $R_{121OFF}$, and a reference voltage of the shunt regulator 120 is represented by $V_{REF}$. The combined resistance value $R_{121OFF}$ of the resistor 121, the resistor 123, the resistor 125, and the resistor 128 is represented by the following expression (1).

$$R_{121OFF} = \frac{R_{121} \cdot (R_{123} + R_{125} + R_{128})}{R_{121} + R_{123} + R_{125} + R_{128}} \quad \text{Expression (1)}$$

An output voltage $V_{O\_OFF}$ in this case is controlled so as to have a value determined by the following expression (2). When the ON duty of the PWM signal 135 output from the CPU 129 is 0%, the output voltage $V_{O\_OFF}$ is the lowest voltage among the voltages that can be taken by the output voltage 116.

$$V_{O\_OFF} = V_{REF} \cdot \frac{R_{121OFF} + R_{122}}{R_{122}} \quad \text{Expression (2)}$$

FIG. 2B is a circuit diagram of a periphery of the output voltage 116 at a time when the ON duty of the PWM signal 135 is 100% and the transistor 126 is in the conductive state in FIG. 1, for example. In this case, when a saturated voltage $V_{CE(sat)}$ between a collector and an emitter of the transistor 126 is assumed to be 0.0 V for simplicity of calculation, a combined resistance value $R_{122ON}$ of the resistor 122, the resistor 123, and the resistor 125 is represented by the following expression (3).

$$R_{122ON} = \frac{R_{122} \cdot (R_{123} + R_{125})}{R_{122} + R_{123} + R_{125}} \quad \text{Expression (3)}$$

An output voltage $V_{O\_ON}$ in this case is controlled so as to have a value determined by the following expression (4). The output voltage $V_{O\_ON}$ is the highest voltage among the voltages that can be taken by the output voltage 116.

$$V_{O\_ON} = V_{REF} \cdot \frac{R_{121} + R_{122ON}}{R_{122ON}} \quad \text{Expression (4)}$$

Next, description is given of operation at a time when the PWM signal 135 has an ON duty other than 0% and 100% with reference to FIG. 1. The PWM signal 135 drives the transistor 126 with a current limited by the resistor 127. A voltage in accordance with the ON duty of the PWM signal 135 is charged to a capacitor 124 at a time constant of the resistor 125 and the capacitor 124. The voltage between both ends of the capacitor 124 is defined as a voltage 136. Here, the time constant of the resistor 125 and the capacitor 124 is set to be large with respect to the frequency of the PWM signal 135. That is, in order to decrease a ripple voltage of the output voltage 116, the voltage 136 is converted into a DC voltage. The voltage 136 converted into a DC voltage is supplied to the REF terminal of the shunt regulator 120 as the reference voltage $V_{REF}$ through the resistor 123 for adjusting a current. The supply amount of the current supplied as the reference voltage $V_{REF}$ to the REF terminal of the shunt regulator 120 is adjusted, to thereby adjust the output voltage 116. That is, the output voltage 116 is adjusted in accordance with the ON duty of the PWM signal 135, and a value that can be taken by the output voltage 116 falls within a range between the voltage values represented by the expression (2) and the expression (4).

FIG. 3 is a graph for showing a waveform (i) of the PWM signal 135 having an ON duty of 60% at a frequency of 10 kHz and a waveform (ii) of the voltage 136 being the voltage between both ends of the capacitor 124. A waveform 137 represented by the alternate long and two short dashes line indicates the voltage 136 at a time when the ON duty is 0% (expression (2)). A waveform 138 represented by the alternate long and short dash line indicates the voltage 136 at a time when the ON duty is 100% (expression (4)). Further, a waveform 139 represented by the solid line indicates the voltage 136 at a time when the PWM signal 135 having an ON duty of 60% at a frequency of 10 kHz is output. In any of the foregoing cases, the horizontal axis represents time, and the vertical axis represents voltage.

In view of the foregoing, the range that can be taken by the output voltage 116 ($V_O$) at a time when the duty of the PWM signal 135 is changed from 0% to 100% can be substantially represented by the following expression (5) based on the expressions (2) and (4).

$$V_{REF} \cdot \frac{R_{121OFF} + R_{122}}{R_{122}} \leq V_O \leq V_{REF} \cdot \frac{R_{121} + R_{122ON}}{R_{122ON}} \quad \text{Expression (5)}$$

However, when the pulse width of the PWM signal 135 is long with respect to the time constant of the capacitor 124 and the resistor 125, a ripple is generated in the voltage 136, and hence a ripple is generated also in the output voltage 116. When the time constant of the capacitor 124 and the resistor 125 is set to an optimum value for a normal mode in which predetermined electric power is consumed, the pulse width of the PWM signal 135 is long with respect to the time constant of the capacitor 124 and the resistor 125 at the time of a power saving mode in which the operation is performed with electric power lower than the predetermined electric power. A ripple voltage is therefore generated in the output voltage 116 at the time of the power saving mode. Further, when the time constant of the capacitor 124 and the resistor 125 is increased in order to reduce a ripple voltage at the time of the power saving mode, there is a risk in that problems such as an increase in time required for starting of the power supply apparatus 100 and an increase in capacity of the capacitor 124 may arise.

(Step of Adjusting Output Voltage for Each Power Supply Apparatus)

The step of adjusting the output voltage 116 is described in detail with reference to FIG. 1. In FIG. 1, the resistor 127 serves as a resistor for limiting a base current of the transistor 126 when the PWM signal 135 is output from the generation unit 131 that is implemented as the function of the CPU 129. A DC/DC converter 133 receives the output voltage 116 being the DC voltage, and generates a voltage 134 required for operation of the CPU 129 and a memory 130. The CPU 129 reads duty information stored in the memory 130, and generates the PWM signal 135 with the generation unit 131 through use of a reference clock 132 included in the CPU 129. The CPU 129 has the normal mode, the power saving mode, and a stop mode. At the time of the power saving mode, the CPU 129 sets the frequency of the reference clock 132 to be lower than that at the time of the normal mode, and at the time of the stop mode, the CPU 129 stops the reference clock 132.

The reference clock 132 being a generation unit generates a clock signal having a first frequency (for example, 1 MHz) in the normal mode corresponding to a first mode in which the predetermined electric power is supplied. The reference clock 132 generates a clock signal having a second frequency (for example, 50 kHz), which is lower than the first frequency, in the power saving mode corresponding to a second mode in which a smaller amount of electric power is consumed than in the first mode. The generation unit 131 being an output unit outputs the PWM signal 135 being a pulse signal that has a duty at which the output voltage 116 reaches the predetermined voltage, to the transistor 126 based on the clock signal generated by the reference clock 132. As the duty information stored in the memory 130, there are given, for example, a duty [%], a high-level clock number, and a low-level clock number. Further, the memory 130 may store duty information for the normal mode and duty information for the power saving mode.

The duty information to be stored in the memory 130 is obtained as follows. In an adjustment step of confirming the operation of the power supply apparatus 100 after the power supply apparatus 100 is manufactured, the duty of the PWM signal 135 is changed while the voltage value of the output voltage 116 is measured outside, and duty information at a time when the output voltage 116 reaches an optimum voltage value is stored in the memory 130. The memory 130 serves as a second storage unit configured to store a duty for outputting the predetermined voltage measured in advance.

(Operation of Power Supply Apparatus)

A sequence of operating the power supply apparatus 100 is described. When an AC voltage is applied to the power supply apparatus 100, the power supply apparatus 100 outputs the output voltage 116. At this time, the CPU 129 has not been activated, and hence the PWM signal 135 is not generated by the generation unit 131. The output voltage 116 therefore has a voltage value at a time when the PWM signal 135 is at a 100% low level (expression (2)). Thus, the output voltage 116 at this time is set to a voltage with which the DC/DC converter 133 can be operated to generate the voltage 134, and the CPU 129 and the memory 130 can be operated.

When the DC/DC converter 133 generates the voltage 134 from the output voltage 116, and the voltage 134 is applied to the CPU 129 and the memory 130, the CPU 129 is activated. When the CPU 129 is activated, the CPU 129 accesses the memory 130. The CPU 129 acquires the duty information stored in the memory 130, and outputs the PWM signal 135 having a predetermined duty with the generation unit 131 based on the acquired duty information. When the PWM signal 135 is output, the output voltage 116 reaches a voltage value obtained through adjustment in the above-mentioned adjustment step, that is, an optimum voltage value for the power supply apparatus 100. Through the above-mentioned operation, the output voltage 116 adjusted to an optimum value for each power supply apparatus 100 can be output.

(Setting of PWM Signal at time of Normal Mode and at time of Power Saving Mode)

As a precondition, the frequency of the reference clock 132 at the time of the normal mode of the CPU 129 is set to, for example, 1 MHz, and the frequency of the PWM signal 135 at the time of the normal mode is set to, for example, 10 kHz. Further, the frequency of the reference clock 132 at the time of the power saving mode of the CPU 129 is set to, for example, 50 kHz, and the frequency of the PWM signal 135 at which an unallowable ripple voltage is generated in the output voltage 116 is set to be less than 5 kHz being a predetermined frequency. The predetermined frequency is the lowest frequency among the frequencies of the PWM signal 135 at which an allowable ripple is generated in the output voltage 116. Further, the duty of the PWM signal 135 optimum for the power supply apparatus 100 is set to 84%.

Figure 4A:
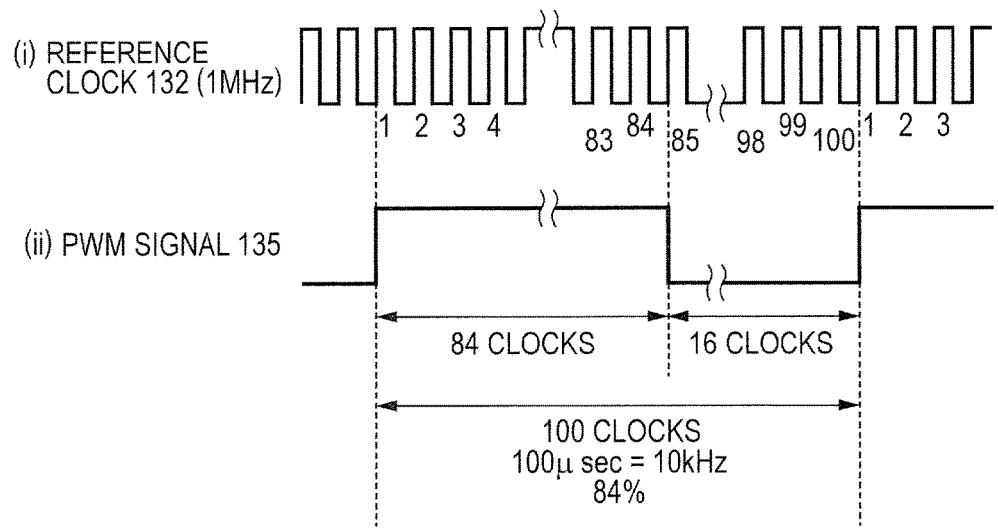
FIG. 4A and FIG. 4B are each a graph for showing waveforms of a reference clock and the PWM signal in the first embodiment.

FIG. 4A is a graph for showing a waveform (i) of the reference clock 132 (1 MHz) and a waveform (ii) of the PWM signal 135 (10 kHz) at a time when the CPU 129 is operated in the normal mode. The horizontal axis represents time. At the time of the normal mode, the reference clock 132 is 1 MHz, and the frequency of the PWM signal 135 is 10 kHz (100 psec (microseconds)). One period of the PWM signal 135 therefore corresponds to 100 clocks of the reference clock 132. The generation unit 131 measures a clock number of the reference clock 132 with a rising edge of the reference clock 132 being a starting point. Then, the generation unit 131 sets the PWM signal 135 at a high level from $1^{st}$ to $84^{th}$ clocks of the reference clock 132, and sets the PWM signal 135 at a low level from $85^{th}$ to $100^{th}$ clocks of the reference clock 132. With this, the generation unit 131 generates the PWM signal 135 having a duty of 84% that is an optimum value for the power supply apparatus 100.

Figure 4B:
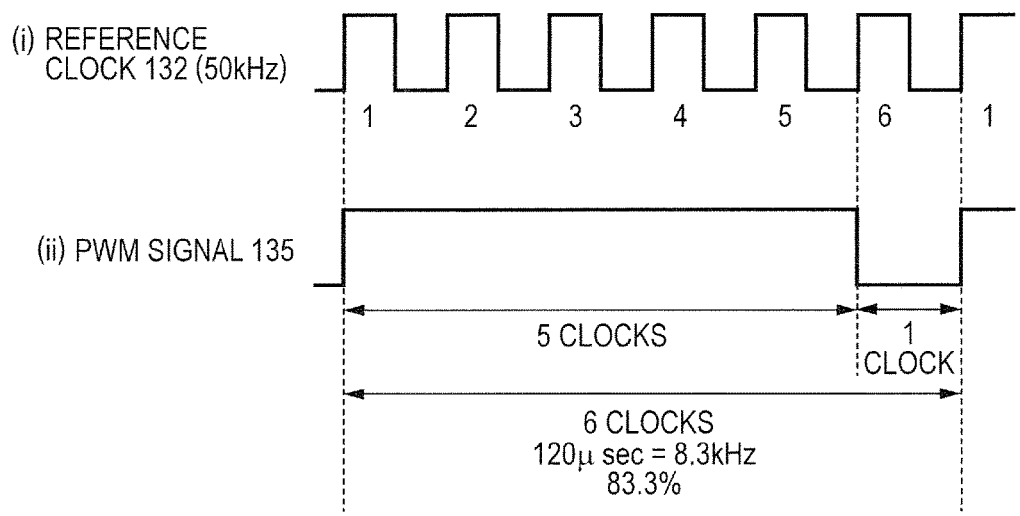

FIG. 4B is a graph for showing a waveform (i) of the reference clock 132 (50 kHz) and a waveform (ii) of the PWM signal 135 at a time when the CPU 129 is operated in the power saving mode. The horizontal axis represents time. At the time of the power saving mode, the reference clock 132 is set to 50 kHz, and the PWM signal 135 has the high level in 5 clocks and the low level in 1 clock. The duty of the PWM signal 135 at this time is about 83.3%. Further, the frequency of the PWM signal 135 is about 8.3 kHz (120 psec) in 6 clocks (=5+1), which is higher than the frequency of less than 5 kHz at which an unallowable ripple voltage is generated in the output voltage 116. In the power saving mode, the PWM signal 135 having a duty of 84% that is an optimum value for the power supply apparatus 100 cannot be output. The reason for this is as follows. When the PWM signal 135 is generated under the precondition, it is required that the PWM signal 135 be at least at the high level in 21 clocks and the low level in 4 clocks for one period, and the frequency of the PWM signal 135 at this time is 2 kHz in 25 clocks. As a result, the frequency of the PWM signal 135 is less than the frequency of 5 kHz, and hence an unallowable ripple voltage is generated in the output voltage 116.

(Method of Searching for Duty at time of Power Saving Mode)

In the first embodiment, the optimum duty of the PWM signal 135 at the time of the power saving mode is set to 83.3% shown in FIG. 4B. The determining processing of a duty of the PWM signal 135 at the time of the power saving mode is described with reference to a flowchart of FIG. 5. The frequency of the reference clock 132 at the time of the power saving mode is 50 kHz, and the frequency of the PWM signal 135 at which an unallowable ripple voltage is generated in the output voltage 116 is less than 5 kHz. The clock number in one period of the PWM signal 135 is therefore up to 10 clocks.

Figure 5:
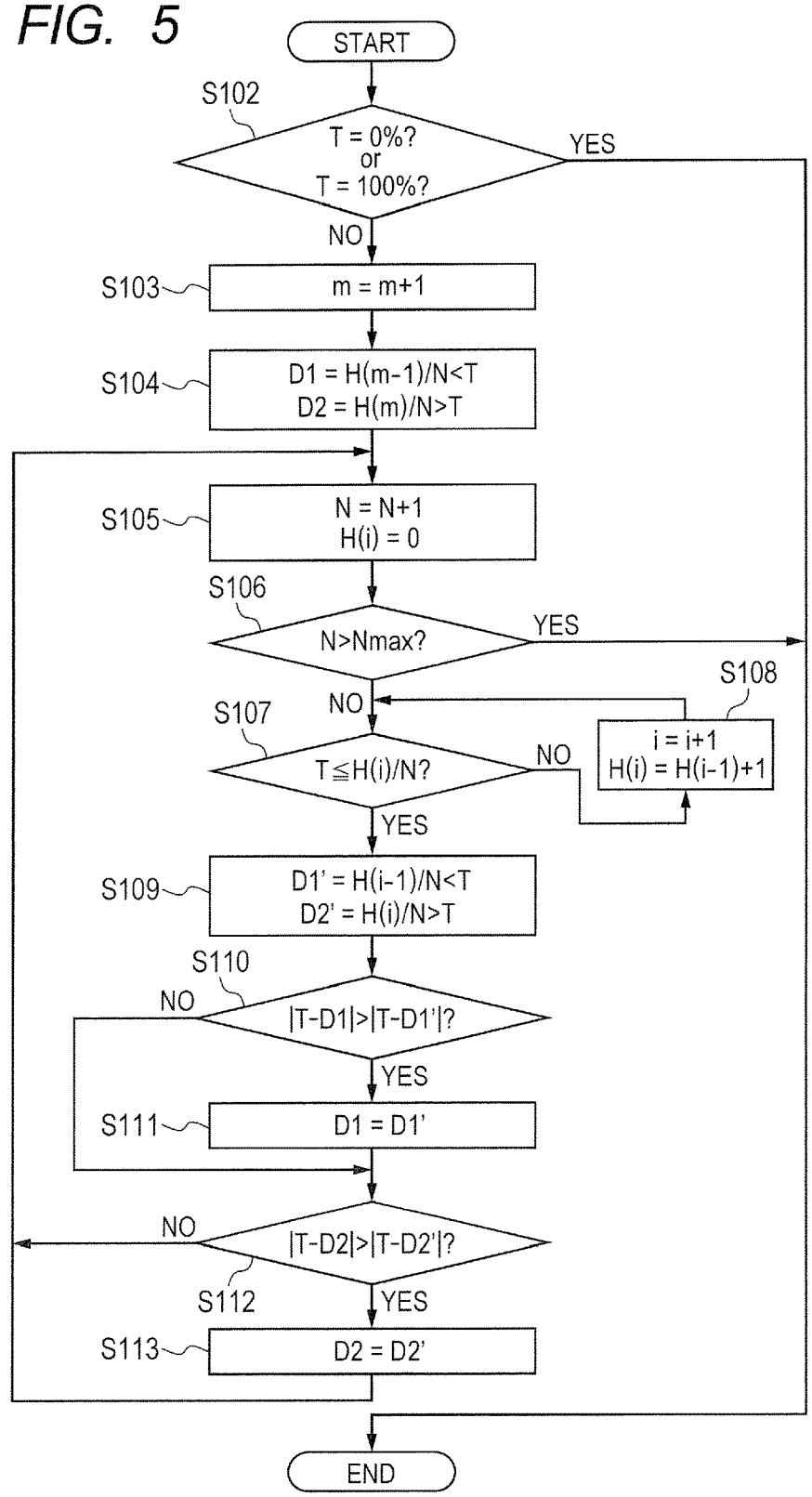
FIG. 5 is a flowchart for illustrating determining processing of a duty of the PWM signal in the first embodiment.

Initial values of variables in FIG. 5 are m=0, i=0, N=1, H(0)=0, and H(1)=1. Further, N represents a total clock number, Nmax represents an allowable total clock number, T represents a target ON duty of the PWM signal 135, and H(m) represents a high-level clock number. D1 represents a duty smaller than the target ON duty T (D1<T). D2 represents a duty equal to or more than the target ON duty T (D2≥T).

The CPU 129 starts a duty search at the time of the power saving mode in Step (hereinafter abbreviated as "S") 102 and the subsequent steps. In S102, the CPU 129 determines whether or not the target ON duty T of the PWM signal 135 is 0% or 100%. When the target ON duty T of the PWM signal 135 is 0% or 100%, it is not necessary to search for an ON duty. Therefore, when the CPU 129 determines that the target ON duty T is 0% or 100% in S102, the CPU 129 ends the processing. When the CPU 129 determines that the target ON duty T is not 0% or 100%, that is, the target ON duty T is larger than 0% and smaller than 100% in S102, the CPU 129 advances the flow to S103. For example, in the case of FIG. 4A, the optimum duty of the PWM signal 135 is 84%, and hence the CPU 129 advances the flow to S103. The CPU 129 sets m=m+1 in S103.

In S104, the CPU 129 sets D1 to D1=H(m−1)/N and D2 to D2=H(m)/N. In this case, D1 is set to a duty smaller than the target ON duty T, and D2 is set to a duty larger than the target ON duty T. In S105, the CPU 129 sets a high-level clock number H(i) to 0 under the condition of N=N+1. The CPU 129 increases the high-level clock number H(i) on a one-by-one basis from 0 to determine an ON duty that approximates the target ON duty T. In S106, the CPU 129 determines whether or not the total clock number N is larger than the allowable total clock number Nmax. When the CPU 129 determines that the total clock number N is larger than the allowable total clock number Nmax in S106, the CPU 129 ends the search. The CPU 129 searches for the PWM signal 135 having a duty in the vicinity of the duty in accordance with the predetermined voltage with the clock signal at the time of the power saving mode being a reference, within a range in which the clock number (N) corresponding to the frequency of the PWM signal 135 does not exceed the predetermined clock number (Nmax).

When the CPU 129 determines that the total clock number N is equal to or less than the allowable total clock number Nmax in S106, the CPU 129 advances the flow to S107. In S107, the CPU 129 determines whether or not a value obtained by dividing the high-level clock number H(i), which represents the number of clocks in which the PWM signal 135 is at the high level, by the total clock number N, that is, H(i)/N being the ON duty is equal to or more than the target ON duty T. When the CPU 129 determines that H(i)/N being the ON duty is not equal or more than the target ON duty T in S107, the CPU 129 advances the flow to S108. In S108, the CPU 129 increases the high-level clock number H(i), which represents the number of clocks in which the PWM signal 135 is at the high level, by 1 under the conditions of i=i+1 and H(i)=H(i−1)+1, and returns the flow to S107. When the CPU 129 determines that H(i)/N being the ON duty is equal to or more than the target ON duty T in S107, the CPU 129 advances the flow to S109.

In S109, the CPU 129 sets D1'=H(i−1)/N and D2'=H(i)/N. In this case, D1' is a duty smaller than the target ON duty T, and D2' is a duty larger than the target ON duty T. In S110, the CPU 129 determines which of D1 determined in S104 or Step S111 and D1' determined in S109 is closer to the target ON duty T. That is, the CPU 129 determines whether or not |T-D1| is larger than |T-D1'|. When the CPU 129 determines in S110 that |T-D1| is larger than |T-D1'|, that is, D1' is closer to the target ON duty T, the CPU 129 advances the flow to S111. In S111, the CPU 129 sets D1=D1'. When the CPU 129 determines in S110 that |T-D1| is equal to or less than |T-D1'|, that is, D1 is closer to the target ON duty T, the CPU 129 advances the flow to S112 while keeping D1.

In S112, the CPU 129 determines which of D2 determined in S104 or S113 and D2' determined in S109 is closer to the target ON duty T. That is, the CPU 129 determines whether or not |T-D2| is larger than |T-D2'|. When the CPU 129 determines in S112 that |T-D2| is larger than |T-D2'|, that is, D2' is closer to the target ON duty T, the CPU 129 advances the flow to S113. In S113, the CPU 129 sets D2=D2', and returns the flow to S105. When the CPU 129 determines in S112 that |T-D2| is equal to or less than |T-D2'|, that is, D2 is closer to the target ON duty T, the CPU 129 returns the flow to S105 while keeping D2. In S105, the CPU 129 searches for an ON duty close to the target ON duty T until the total clock number N exceeds the allowable total clock number Nmax in S106 in the same manner under the condition of N=N+1. As described above, the CPU 129 serves as a determining unit configured to determine a duty of the PWM signal 135 in accordance with the predetermined voltage so that the frequency of the PWM signal 135 does not fall below the predetermined frequency at the time of the power saving mode.

Through the above-mentioned search processing, D1 and D2 that are closest to the target ON duty T can be obtained. Which of D1 and D2 is adopted depends on the viewpoint at a time when the target ON duty T is set. For example, when the target ON duty T is set to a center value of an optimum value, it is suitable that, of D1 and D2, D1 closer to the target ON duty T be set. When the target ON duty T is set to a lower limit of the optimum value, it is suitable to set D2 larger than the target ON duty T, which does not allow the duty to be lower than the optimum value.

When the search processing is performed with the constants of the first embodiment, the results are as follows:
When Nmax=1, D1=0% (0/1), D2=100% (1/1)
When Nmax=2, D1=50% (1/2), D2=100% (1/1)
When Nmax=3, D1=66.7% (2/3), D2=100% (1/1)
When Nmax=4, D1=75% (3/4), D2=100% (1/1)
When Nmax=5, D1=80% (4/5), D2=100% (1/1)
When Nmax=6, D1=83.3% (5/6), D2=100% (1/1)
When Nmax=7, D1=83.3% (5/6), D2=85.7% (6/7)
When Nmax=8, D1=83.3% (5/6), D2=85.7% (6/7)
When Nmax=9, D1=83.3% (5/6), D2=85.7% (6/7)
When Nmax=10, D1=83.3% (5/6), D2=85.7% (6/7).

The numbers in the parentheses indicate (high-level clock number H(i)/total clock number N). The following may also be possible. An allowable difference is set in the target ON duty T, and the search processing is ended when the ON duty falls within the allowable difference. This search method is illustrated in FIG. 7 and described in a third embodiment of the present invention.

(CPU at Time of Stop Mode)

The CPU 129 cannot output the PWM signal 135 at the time of the stop mode because the reference clock 132 is stopped. In this case, depending on the kind of the CPU 129, the CPU 129 can transition to the stop mode after setting an output mode. When the output of the PWM signal 135 from the CPU 129 can be set to the high level or the low level, it is only required that the output be set to a more suitable level in accordance with the specification of the power supply apparatus 100. For example, the output is set to the output voltage 116 with which further power saving can be achieved.

In the first embodiment, description is given of a method of determining a duty (high-level clock number and low-level clock number) at the time of the power saving mode based on the duty information for the normal mode. However, the information on an optimum duty at the time of the power saving mode may be stored in the memory 130 separately from the information on an optimum duty at the time of the normal mode. In the first embodiment, the AC/DC converter is exemplified. However, the configuration of the power supply apparatus 100 is not limited to the above-mentioned configuration, and the power supply apparatus 100 may also be applied to a DC/DC converter.

As described above, in the power saving mode in which the frequency of the reference clock 132 of the CPU 129 configured to generate the PWM signal 135 is low, the following effects are exhibited. That is, the duty of the PWM signal 135, in other words, the output voltage 116, can be adjusted in accordance with the specification of the power supply apparatus 100 while the generation of a ripple voltage in the output voltage 116 is reduced as compared to that at the time of the normal mode. Thus, according to the first embodiment, in the operation mode in which the frequency of the reference clock is lower than that at the time of the normal mode, the duty of the PWM signal can be adjusted while a ripple of the output voltage is reduced.

In a second embodiment of the present invention, a method of enhancing the resolution of adjustment of the output voltage 116 by setting, at the time of the power saving mode, the PWM signal 135 to a PWM signal 201 formed of a plurality of duties is described with reference to Table 1, Table 2, and FIG. 6A to FIG. 6C. The same configurations as those of the first embodiment are denoted by the same reference symbols as those therein, and the description thereof is omitted. As a precondition, the frequency of the reference clock 132 at the time of the normal mode of the CPU 129 is set to 1 MHz, and the frequency of the PWM signal 135 at the time of the normal mode is set to 10 kHz. Further, the frequency of the reference clock 132 at the time of the power saving mode of the CPU 129 is set to 50 kHz, and the frequency of the PWM signal 135 at which an unallowable ripple voltage is generated in the output voltage 116 is set to be less than 5 kHz. Further, the duty of the PWM signal 135 optimum for the power supply apparatus 100 is set to 65%.

(Example of Determination of PWM Signal 135 in Second Embodiment)

Combinations of signal names and clock numbers of the PWM signal 135 determined by the search processing in the first embodiment are shown in Table 1.

TABLE 1

| Duty [%] | Frequency [kHz] | Hi clock number | Lo clock number | Signal name |
| --- | --- | --- | --- | --- |
| 50.0% | 25.0 | 1 | 1 | DS1 |
| 55.6% | 5.6 | 5 | 4 | DS2 |
| 57.1% | 7.1 | 4 | 3 | DS3 |
| 60.0% | 10.0 | 3 | 2 | DS4 |
| 62.5% | 6.3 | 5 | 3 | DS5 |
| 66.7% | 16.7 | 2 | 1 | DS6 |
| 70.0% | 5.0 | 7 | 3 | DS7 |
| 71.4% | 7.1 | 5 | 2 | DS8 |
| 75.0% | 12.5 | 3 | 1 | DS9 |
| 77.8% | 5.6 | 7 | 2 | DS10 |
| 80.0% | 10.0 | 4 | 1 | DS11 |
| 83.3% | 8.3 | 5 | 1 | DS12 |
| 85.7% | 7.1 | 6 | 1 | DS13 |
| 87.5% | 6.3 | 7 | 1 | DS14 |
| 88.9% | 5.6 | 8 | 1 | DS15 |
| 90.0% | 5.0 | 9 | 1 | DS16 |
| 100.0% | — | 10 | 0 | DS17 |

In Table 1, from the left column, a duty [%] of the PWM signal 135, a frequency [kHz] of the PWM signal 135, a high-level clock number (Hi clock number), which represents the number of clocks in which the PWM signal 135 is at the high level, and a low-level clock number (Lo clock number), which represents the number of clocks in which the PWM signal 135 is at the low level, and a signal name are shown. The PWM signal 135 having an ON duty of from 0% to 50% can be expressed merely by reversing the high-level clock number and the low-level clock number with respect to the PWM signal 135 having an ON duty of from 50% to 100%, and hence is omitted in Table 1. For example, in Table 1, the PWM signal 135 having an ON duty of 30% can be expressed with "3:7" reverse to "7:3" (high-level clock number:low-level clock number) of the PWM signal 135 having an ON duty of 70%.

Under the condition that the total clock number Nmax at which an allowable ripple voltage is generated is 10 clocks, as shown in Table 1, the PWM signal 135 can be expressed in 17 patterns of from 50% to 100%. However, the patterns in Table 1 may not be sufficient as the resolution for adjustment of the output voltage 116. For example, 50.0% is followed by 55.6%, and hence the resolution of the duty of the PWM signal 135 is 5.6%. In this case, the PWM signal 135 having a duty finer than those shown in Table 1 can be expressed by a combination of a plurality of PWM signals as shown in Table 2. The combination of the plurality of PWM signals also means combining a plurality of signals, and a signal obtained by combining a plurality of signals is referred to as a mixing signal.

In Table 2, there is shown an example in which the ON duty of the PWM signal 135 is formed of a mixing signal with every 2.5%. In this manner, when signals having a resolution of, for example, 5.6%, in Table 1 are combined, the resolution can be set to, for example, 2.5%.

TABLE 2

| Duty [%] | PWM1 | PWM2 | PWM3 | PWM4 |
| --- | --- | --- | --- | --- |
| 50.0% | DS1 × 1 | DS1 × 1 | DS1 × 1 | DS1 × 1 |
| 52.5% | DS1 × 5 | DS1 × 5 | DS1 × 5 | DS4 × 2 |
| 55.0% | DS1 × 5 | DS1 × 5 | DS4 × 2 | DS4 × 2 |
| 57.5% | DS1 × 5 | DS4 × 2 | DS4 × 2 | DS4 × 2 |
| 60.0% | DS4 × 1 | DS4 × 1 | DS4 × 1 | DS4 × 1 |
| 62.5% | DS5 × 1 | DS5 × 1 | DS5 × 1 | DS5 × 1 |
| 65.0% | DS4 × 1 | DS4 × 1 | DS4 × 1 | DS11 × 1 |
| 67.5% | DS7 × 1 | DS7 × 1 | DS7 × 1 | DS4 × 2 |
| 70.0% | DS7 × 1 | DS7 × 1 | DS7 × 1 | DS7 × 1 |
| 72.5% | DS7 × 1 | DS7 × 1 | DS7 × 1 | DS11 × 2 |
| 75.0% | DS9 × 1 | DS9 × 1 | DS9 × 1 | DS9 × 1 |
| 77.5% | DS7 × 1 | DS11 × 2 | DS11 × 2 | DS11 × 2 |
| 80.0% | DS11 × 1 | DS11 × 1 | DS11 × 1 | DS11 × 1 |
| 82.5% | DS11 × 2 | DS11 × 2 | DS11 × 2 | DS16 × 1 |
| 85.0% | DS11 × 2 | DS11 × 2 | DS16 × 1 | DS16 × 1 |
| 87.5% | DS11 × 2 | DS16 × 1 | DS16 × 1 | DS16 × 1 |
| 90.0% | DS16 × 1 | DS16 × 1 | DS16 × 1 | DS16 × 1 |
| 100.0% | DS17 × 1 | DS17 × 1 | DS17 × 1 | DS17 × 1 |

Table 2 is a table for showing adjustment of a duty of the PWM signal 135 in the second embodiment, and from the left column, a duty [%] of the PWM signal 135, PWM1, PWM2, PWM3, and PWM4 are shown. PWM1+PWM2+PWM3+PWM4 is grasped as one PWM signal 135 (mixing signal). Further, DSx (x=1 to 17) represents the signal name in Table 1.

For example, the PWM signal 135 having an ON duty of 75.0% is expressed by DS9×1+DS9×1+DS9×1+DS9×1 in Table 2. With this, the PWM signal 135 that cannot be implemented with the total clock number N falling within 10 can be implemented with a ripple voltage being hardly generated.

In the second embodiment, combination data of the mixing signals in Table 2 is stored in, for example, the memory 130. The memory 130 serves as a first storage unit configured to store combinations of a predetermined number of PWM signals. The CPU 129 reads the combination data in Table 2 from the memory 130, and outputs the mixing signal as the PWM signal 135 in accordance with the duty of the PWM signal 135 optimum for the power supply apparatus 100. With this, the adjusted output voltage 116 is output. The resolution of adjustment of the output voltage 116 may also be further enhanced through use of the duties of the PWM signal 135 in Table 1 and Table 2. The combination data of the PWM signal 135 in Table 2 is an example, and the present invention is not limited to the combinations.

Further, under the precondition of the second embodiment, the duty between 90.0% and 100% cannot be implemented because a ripple voltage increases. The duty between 10% and 0% cannot be implemented similarly. This is because the low-level clock number or the high-level clock number is required to be at least one. In view of the foregoing, when the resolution of 10% is not allowed in the duty of the PWM signal 135, it is required that the adjustment range of the output voltage 116 be set so as to avoid a range of from 90.0% to 100% and a range of from 0% to 10%.

(Waveform of PWM Signal in Second Embodiment)

Figure 6A:
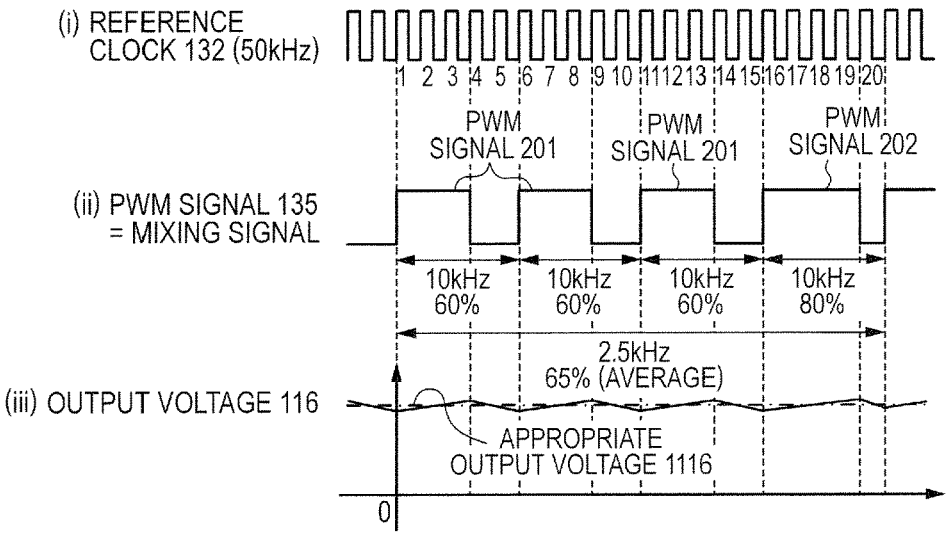
FIG. 6A, FIG. 6B, and FIG. 6C are each a graph for showing waveforms of a reference clock, a PWM signal, and an output voltage in a second embodiment of the present invention.

FIG. 6A is a graph for showing a waveform (i) of the reference clock 132 (50 kHz), a waveform (ii) of the PWM signal 135 being the mixing signal, and a waveform (iii) of the output voltage 116 at the time of the power saving mode in the second embodiment. The alternate long and short dash line represents the output voltage 116 optimum for the power supply apparatus 100. The mixing signal is the PWM signal 135 having an average ON duty of 65%. When the ON duty of the PWM signal 135 being the mixing signal is 65%, PWM1+PWM2+PWM3+PWM4 is DS4×1+DS4×1+DS4×1+DS11×1 as shown in Table 2. Further, as shown in Table 1, DS4 represents the PWM signal 135 having a duty of 60%, a frequency of 10 kHz, a high-level clock number of 3, and a low-level clock number of 2. Further, as shown in Table 1, DS11 represents the PWM signal 135 having a duty of 80%, a frequency of 10 kHz, a high-level clock number of 4, and a low-level clock number of 1.

In this case, the frequency of the PWM signal 135 being the mixing signal is 2.5 kHz (20 clocks), that is, less than 5 kHz, at which an unallowable ripple voltage is generated. However, the PWM signal 201 (DS4) and a PWM signal 202 (DS11) that form the mixing signal each have a frequency of 10 kHz, that is, higher than 5 kHz, at which an allowable ripple voltage is generated. The ripple voltage therefore does not cause a problem. The combination of the mixing signals is not limited to the above-mentioned example, and it is only required that the number of signals be determined to generate an allowable ripple voltage. That is, four PWM signals are combined to form a mixing signal in Table 2, but two or more PWM signals may be combined to form a mixing signal. The CPU 129 combines a predetermined number (for example, four) of PWM signals from a plurality of pulse signals, which are retrieved and determined with respect to different duties, so that an average of duties of the predetermined number of PWM signals is a duty in accordance with the predetermined voltage. The generation unit 131 outputs the combination of the predetermined number of PWM signals to the transistor 126.

Figure 6B:
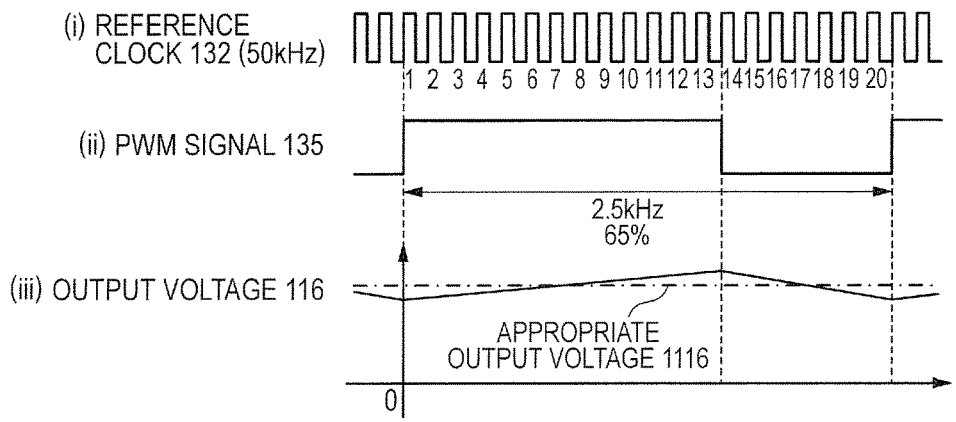
Figure 6C:
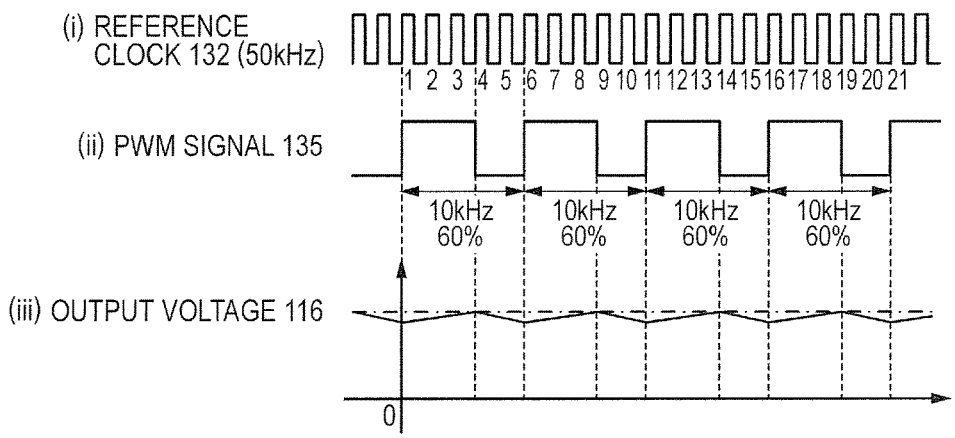

Here, when the PWM signal 135 having a duty of 65% is generated with one PWM signal from the reference clock 132 of 50 kHz, the results are as shown in FIG. 6B. FIG. 6B is a graph for showing the waveforms (i) to (iii) in the same manner as in FIG. 6A. As shown in FIG. 6B, the PWM signal 135 has a frequency of 2.5 kHz, and hence a ripple voltage of the output voltage 116 is larger than that of FIG. 6A. Further, when the PWM signal 135 having a duty close to 65% is generated, the results are as shown in FIG. 6C. FIG. 6C is a graph for showing the waveforms (i) to (iii) in the same manner as in FIG. 6A. For example, in Table 1, the PWM signal 135 having a duty of 60% has a frequency of 10 kHz, a high-level clock number of 3, and a low-level clock number of 2. As shown in FIG. 6C, when the frequency of the PWM signal 135 is set to 10 kHz and the duty thereof is set to 60%, although a ripple voltage is small, the output voltage 116 output from the power supply apparatus 100 has a voltage value lower than that of the optimum output voltage 116.

As described above, the generation of a ripple of the output voltage can be reduced as compared to that at the time of the normal mode while the resolution of the PWM signal 135 at the time of the power saving mode is further finely set. Thus, according to the second embodiment, in the operation mode in which the frequency of the reference clock is lower than that at the time of the normal mode, the duty of the PWM signal can be adjusted while a ripple of the output voltage is reduced.

In the third embodiment, regarding the method of enhancing the resolution of adjustment of the output voltage 116 by using a mixing signal as the PWM signal 135 at the time of the power saving mode, a method of enhancing the resolution that is different from that of the second embodiment is described with reference to FIG. 7 and FIG. 8. The same configurations as those in the first embodiment are denoted by the same reference symbols as those therein, and the description thereof is omitted.

(Determining Processing of PWM Signal in Third Embodiment)

The determining processing of a mixing signal is described with reference to the flowchart of FIG. 7. The same processing as that of FIG. 5 is denoted by the same step number, and the description thereof is omitted. In the second embodiment, the duty information on the PWM signal 135 being the mixing signal is stored in the memory 130. However, in the third embodiment, the PWM signal 135 for implementing the target duty T is searched for. As a precondition, the duty of the PWM signal 135 optimum for the power supply apparatus 100 is set to 65%. The target duty T at the time of the power saving mode is set to a value that is ±α % of 65%, for example, α=1 (±1%), and when a PWM signal having a duty falling within a range of, for example, 64% or more and 66% or less, is found, the search is ended. The CPU 129 determines the duty of the PWM signal 135 so that the duty of the PWM signal 135 falls within the predetermined range (within the range of ±α%).

FIG. 7 is different from FIG. 5 in that there is the processing of S201 of determining whether or not any one of D1 and D2 has reached the target ON duty T within the predetermined range after the processing of S104, S112, or S113 in FIG. 7. In S201, the CPU 129 determines whether the condition that D1 is larger than T−α or the condition that D2 is smaller than T+α is satisfied. When the CPU 129 determines that the condition that D1 is larger than T−α or the condition that D2 is smaller than T+α is satisfied in S201, it can be considered that any one of D1 and D2 has reached the target ON duty T within the range of ±α. In this case, the CPU 129 advances the flow to S202. In S202, the CPU 129 sets D1 or D2 considered to have reached the target ON duty T to the target ON duty T, and ends the search processing. When the CPU 129 determines that none of D1 and D2 has reached the target ON duty T within the range of ±α, the CPU 129 performs the processing in S105 and the subsequent steps.

As shown in Table 1, there is no PWM signal 135 having the target ON duty T of 65% among the duties with a total clock number N of 10 at which an allowable ripple voltage is generated. As a subsequent candidate, it is necessary to search for the PWM signal 135 having a total clock number N of 10 or more. In this case, the PWM signal 135 having the target ON duty T is searched for by the search method of FIG. 7. In consideration of, for example, a case in which a combination with which the PWM signal 135 has the target ON duty T as its ON duty is not found or a case in which one period of a mixing signal is too long and a ripple voltage is generated in the period, the allowable total clock number Nmax is set to 20, as an example.

When the duty of the PWM signal 135 is searched for by the search method of FIG. 7, D1=9/14=64.3% is obtained when N=14, i=9, and H(i)=9. In this case, the total clock number N is 14, which is larger than 10 clocks at which an allowable ripple voltage is generated. The PWM signal 135 therefore is required to be a mixing signal. A combination of a high-level clock number and a low-level clock number can be divided to, for example, 5 clocks and 2 clocks, and 4 clocks and 3 clocks. The PWM signal 135 in this case is shown in FIG. 8. FIG. 8 is a graph for showing a waveform (i) of the reference clock 132 (50 kHz) of the CPU 129 and a waveform (ii) of the PWM signal 135 being the mixing signal. The horizontal axis represents time. Further, the combination of the mixing signals is not limited to the above-mentioned example, and it is only required that the number of signals be determined to generate an allowable ripple voltage.

Figure 8:
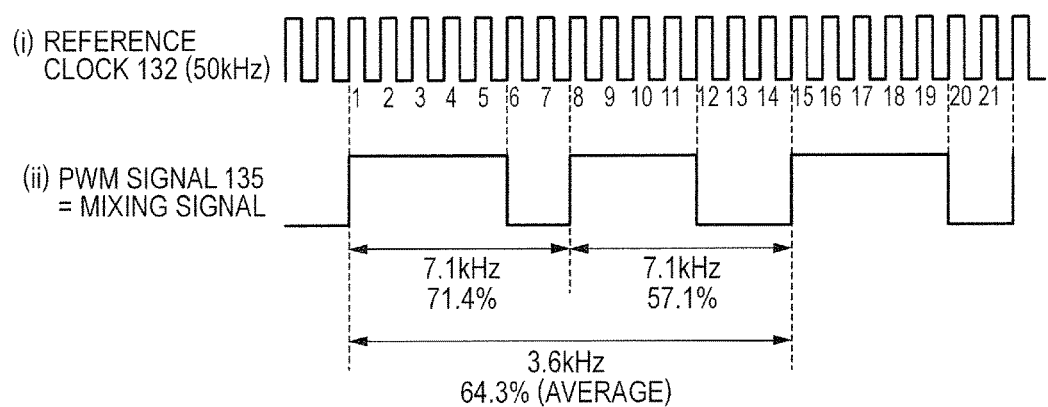
FIG. 8 is a graph for showing waveforms of a reference clock and a PWM signal in the third embodiment.

In FIG. 8, the PWM signal 135 having a duty of 64.3% is a signal having a total clock number N of 14 and a frequency of 3.6 kHz, the frequency being less than 5 kHz at which an unallowable ripple voltage is generated (total clock number N is more than 10 clocks). The PWM signal 135 is set to the mixing signal and divided to a first PWM signal and a second PWM signal. The first PWM signal is a signal having a total clock number N of 7 (high-level clock number of 5 and low-level clock number of 2) and a frequency of 7.1 kHz, the frequency being equal to or more than 5 kHz at which an allowable ripple voltage is generated (total clock number N is equal to or less than 10 clocks). Further, the first PWM signal has an ON duty of 71.4%. The second PWM signal is a signal having a total clock number N of 7 (high-level clock number of 4 and low-level clock number of 3) and a frequency of 7.1 kHz, the frequency being equal to or more than 5 kHz at which an allowable ripple voltage is generated (total clock number N is equal to or less than 10 clocks). Further, the second PWM signal has an ON duty of 57.1%.

Further, in the processing of S106 of FIG. 7, when the total clock number N has reached the allowable total clock number Nmax, and a PWM signal having the target ON duty T has not been found, it is only required to determine that the CPU 129 has a failure or to cause the CPU 129 to operate at a duty close to the target duty as appropriate in accordance with the specification of the power supply apparatus 100.

As described above, the resolution of the PWM signal 135 at the time of the power saving mode can be further finely set without storing the combination of the PWM signals 135 in the memory 130 for each duty. The generation of a ripple in the output voltage 116 can be reduced as compared to that at the time of the normal mode. Thus, according to the third embodiment, in the operation mode in which the frequency of the reference clock is lower than that at the time of the normal mode, the duty of the PWM signal can be adjusted while a ripple of the output voltage is reduced.

In a fourth embodiment of the present invention, a configuration in which the memory 130 is omitted from the circuit diagram of the first embodiment is described. The same configurations as those in the previous embodiments are denoted by the same reference symbols as those therein, and the description thereof is omitted.

(Mechanism of Monitoring and Adjusting Output Voltage 116 with CPU)

Figure 9:
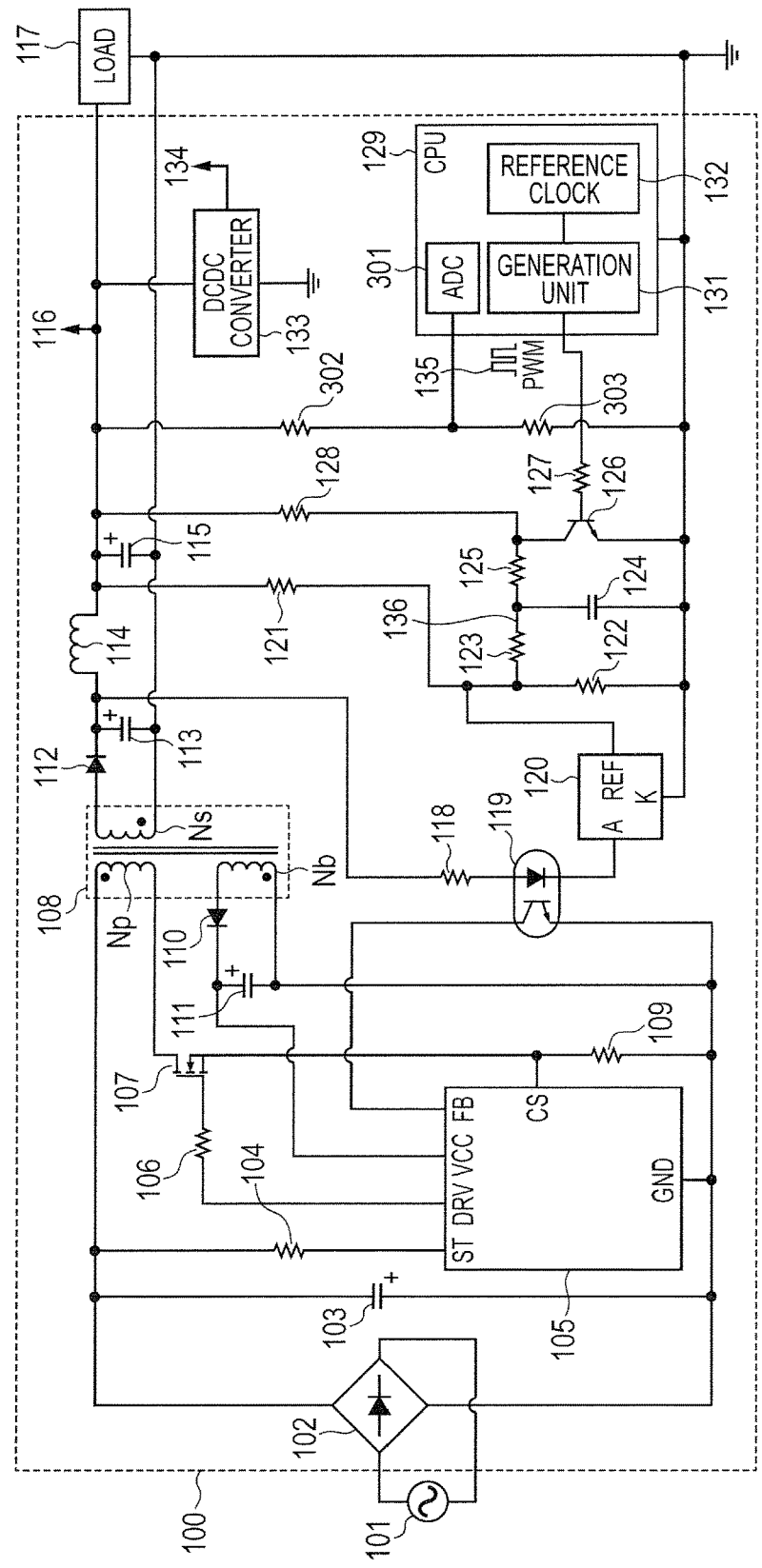
FIG. 9 is a circuit diagram of a power supply apparatus 100 of a fourth embodiment of the present invention.

FIG. 9 is a circuit diagram for illustrating the power supply apparatus 100 of the fourth embodiment. The CPU 129 includes an analog/digital (hereinafter referred to as "AD") converter 301 (represented by "ADC" in FIG. 9). A voltage obtained by dividing the output voltage 116 with resistors 302 and 303 is read by the AD converter 301 of the CPU 129, and the CPU 129 determines a duty of the PWM signal 135 based on the voltage read by the AD converter 301. The CPU 129 serves as a monitoring unit configured to monitor the output voltage 116. The CPU 129 searches for a duty of the PWM signal 135 for outputting a predetermined voltage based on the monitored output voltage 116.

When resistances of the resistors 302 and 303 are represented by $R_{302}$ and $R_{303}$, respectively, a voltage $V_{AD}$ obtained by dividing the output voltage 116 with the resistors 302 and 303 is represented by the following expression (6).

$$V_{AD} = V_O \cdot \frac{R_{303}}{R_{302} + R_{303}} \qquad \text{Expression (6)}$$

The output voltage 116 ($V_O$) is represented by the following expression (7).

The CPU 129 can monitor a voltage value of the output voltage 116.

$$V_O = V_{AD} \cdot \frac{R_{302} + R_{303}}{R_{303}} \qquad \text{Expression (7)}$$

When the saturated voltage $V_{CE(sat)}$ between the collector and the emitter of the transistor 126 is set to 0.0 V for simplicity of description, the ON duty of the PWM signal 135 and the output voltage 116 substantially have a proportional relationship. When the ON duty of the PWM signal 135 is represented by D, the ON duty D can be represented by the following expression (8) through use of a target voltage value $V_{O\_T}$ of the output voltage 116.

$$D = \frac{V_{O\_T} - V_{O\_OFF}}{V_{O\_ON} - V_{O\_OFF}} \qquad \text{Expression (8)}$$

The CPU 129 can specify an optimum ON duty by monitoring the output voltages $V_{O\_ON}$ and $V_{O\_OFF}$ with the AD converter 301 of the CPU 129. However, actually, there is the saturated voltage $V_{CE(sat)}$ between the collector and the emitter of the transistor 126, and hence it is necessary to finely adjust the duty of the PWM signal 135.

A method of setting a duty of the PWM signal 135 to the target voltage at the time of the normal mode involves, for example, causing the CPU 129 to monitor the output voltages $V_{O\_ON}$ and $V_{O\_OFF}$ with the AD converter 301, determining an optimum ON duty D by the expression (8), and outputting the PWM signal 135. When there is a deviation from the target voltage as a result of monitoring with the AD converter 301, it is only required to finely adjust the ON duty D. Actually, there are variations in reading accuracy of the AD converter 301 and in resistance values of the resistors 302 and 303, and hence notice should be taken of a difference between the output voltage 116 adjusted by the CPU 129 and the actual output voltage 116.

(Specific Numerical Example)

Specific values are set as follows, for example: R121=18 kΩ, R122=5.6 kΩ, R123=68 kΩ, R125=10 kΩ, R128=10 kΩ, R302=100 kΩ, R303=100 kΩ, and $V_{REF}$=1.25 V. The range of the adjustment of the output voltage 116 at a time when the duty of the PWM signal 135 is changed from 0% to 100% falls within a range of from 4.59 V to 5.56 V based on the expressions (1) to (5). That is, when the values of each resistance and voltage are set to the above-mentioned values, the CPU 129 monitors the output voltage 116 with the AD converter 301 to obtain 5.56 V as the output voltage $V_{O\_ON}$ and 4.59 V as the output voltage $V_{O\_OFF}$. When the target voltage $V_{O\_T}$ is set to 5.20 V, the optimum ON duty D of the PWM signal 135 has the following value based on the expression (8).

$$D = \frac{5.20 - 4.59}{5.56 - 4.59} = 62.9[\%]$$

From the above-mentioned results, the ON duty at the time of the normal mode is set to 63.0%. That is, the high-level clock number is set to 63 clocks, and the low-level clock number is set to 37 clocks.

It is only required that the ON duty at the time of the power saving mode be set by the method described in the first embodiment based on the optimum ON duty D at the time of the normal mode. In the example of the above-mentioned constants, the ON duty D of the PWM signal 135 is 62.9[%]. With the search method (see Table 1) of the first embodiment, D1=62.5% (⅝) and D2=66.7% (⅔) are therefore obtained. The numbers in the parentheses indicate (high-level clock number/total clock number). The optimum ON duty D is 62.9%, and of D1 and D2, D1 closer to the optimum ON duty D may be set as the ON duty at the time of the power saving mode.

Further, as described in the second and third embodiments, a mixing signal obtained by combining a plurality of PWM signals may be used as the PWM signal 135. For example, when the high-level clock number is set to 17, and the low-level clock number is set to 10 for the PWM signal 135 being the mixing signal, the ON duty of the PWM signal 135 is 63.0%. In this case, the total clock number N of the PWM signal 135 is 27, and hence the PWM signal 135 is divided to a plurality of PWM signals so that the total clock number N is 10 or less. For example, the PWM signal 135 is divided to three PWM signals so that the total clock number N is 9 (frequency: 5.6 Hz), and a signal corresponding to the PWM signal 135 as the mixing signal that has a duty of 63.0% is selected from Table 1.

As described above, the optimum ON duties D at the time of the normal mode and at the time of the power saving mode can be set without using a memory. Thus, according to the fourth embodiment, in the operation mode in which the frequency of the reference clock is lower than that at the time of the normal mode, the duty of the PWM signal can be adjusted while a ripple of the output voltage is reduced.

The power supply apparatus 100 described in the first to fourth embodiments is applicable as, for example, a low-voltage power supply of an image forming apparatus, that is, a power supply configured to supply electric power to a controller (control unit) and a drive unit, for example, a motor. In the following, description is given of the configuration of an image forming apparatus to which the power supply apparatus 100 of the first to fourth embodiments is applied.

[Configuration of Image Forming Apparatus]

Figure 10:
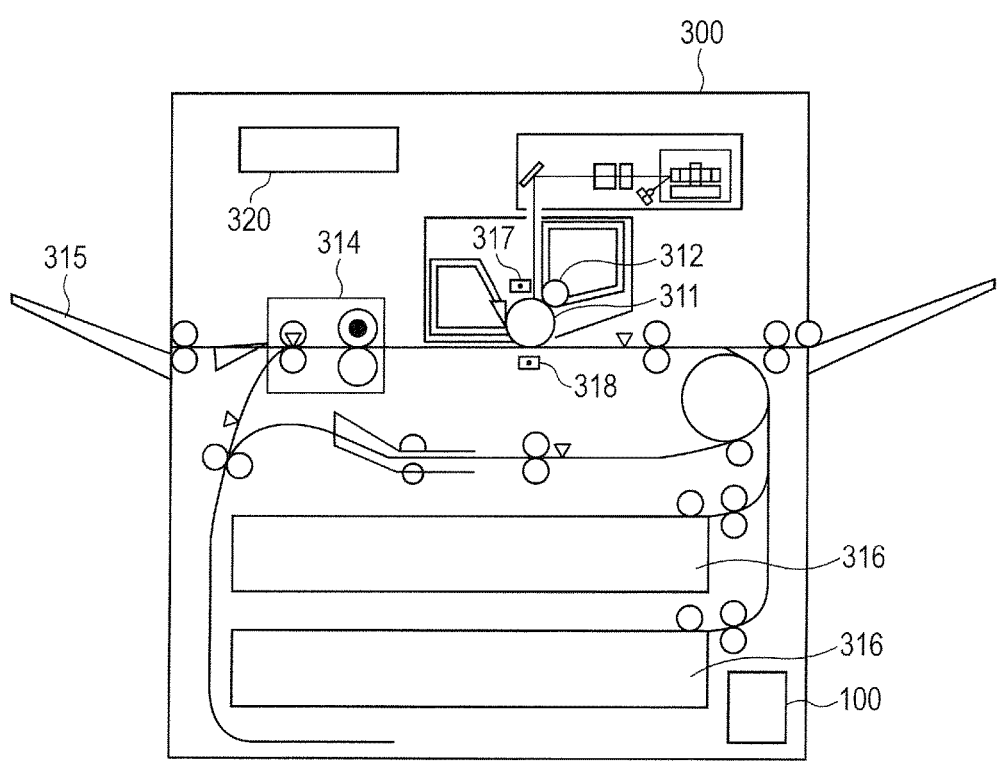
FIG. 10 is a view for illustrating a configuration of an image forming apparatus of a fifth embodiment of the present invention.

As an example of an image forming apparatus, a laser beam printer is exemplified. A schematic configuration of a laser beam printer being an example of an electrophotographic printer is illustrated in FIG. 10. A laser beam printer 300 includes a photosensitive drum 311 serving as an image bearing member on which an electrostatic latent image is formed, a charging portion 317 (charging unit) configured to uniformly charge the photosensitive drum 311, and a developing portion 312 (developing unit) configured to develop the electrostatic latent image formed on the photosensitive drum 311 with a toner. A toner image developed to the photosensitive drum 311 is transferred onto a sheet (not shown) serving as a recording material supplied from a cassette 316 with a transfer portion 318 (transfer unit). The toner image transferred onto the sheet is fixed with a fixing device 314, and the sheet is delivered to a tray 315. The photosensitive drum 311, the charging portion 317, the developing portion 312, and the transfer portion 318 form an image forming unit. The laser beam printer 300 further includes the power supply apparatus 100 described in the first to fourth embodiments. The image forming apparatus to which the power supply apparatus 100 of the first to fourth embodiments is applicable is not limited to the laser beam printer 300 illustrated in FIG. 10, and may be, for example, an image forming apparatus including a plurality of image forming units. The image forming apparatus may further include a primary transfer portion configured to transfer the toner image on the photosensitive drum 311 onto an intermediate transfer belt and a secondary transfer portion configured to transfer the toner image on the intermediate transfer belt onto the sheet.

The laser beam printer 300 includes a controller 320 configured to control image forming operation by the image forming unit and sheet conveying operation, and the power supply apparatus 100 described in the first to fourth embodiments supplies electric power to the controller 320, for example. Further, the power supply apparatus 100 described in the first to fourth embodiments supplies electric power to a drive unit, for example, a motor for rotating the photosensitive drum 311 or driving various rollers configured to convey the sheet. That is, the load 117 of the first to fourth embodiments corresponds to the controller 320 or the drive unit. When the image forming apparatus of a fifth embodiment of the present invention is in a standby state (for example, the power saving mode or a standby mode) for achieving power saving, power consumption can be lowered by reducing the load, for example, by supplying electric power only to the controller 320. That is, at the time of the power saving mode, the image forming apparatus of the fifth embodiment performs operation in which a ripple of the output voltage 116 is reduced in the power saving mode of the power supply apparatus 100 described in the first to fourth embodiments.

For example, in an image forming apparatus including a USB port or the like, a USB device may be inserted and used even at the time of the power saving mode. The accuracy of the voltage supplied to the USB port is required to be maintained. In such case, when the image forming apparatus includes the power supply apparatus 100 of the first to fourth embodiments, a ripple of the output voltage 116 is reduced, and hence a stable voltage can be supplied to the USB port. The CPU 129 described in the first to fourth embodiments may be a CPU included in the controller 320. Thus, according to the fifth embodiment, in the operation mode in which the frequency of the reference clock is lower than that at the time of the normal mode, the duty of the PWM signal can be adjusted while a ripple of the output voltage is reduced.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-008737, filed Jan. 20, 2017, which is hereby incorporated by reference herein in its entirety.

What is claimed is:

1. A power supply apparatus comprising: a transformer including a primary winding and a secondary winding; a switching element connected to the primary winding of the transformer, the switching element configured to drive so as to intermittently supply a current to the primary winding; a feedback unit configured to output a feedback signal according to an output voltage output from the secondary winding of the transformer; a control unit configured to control a driven state of the switching element based on a value of the feedback signal output from the feedback unit, wherein the driven state is switched to drive the switching element in either one of a first frequency and a second frequency lower than the first frequency; a generation unit configured to generate a first clock signal corresponding to the first frequency and a second clock signal corresponding to the second frequency; an output unit connected to the feedback unit, the output unit configured to output a pulse signal for adjusting a value of the feedback signal, wherein the output unit controls a turn-on time period of the pulse signal based on either one of the first frequency and the second frequency so that the output voltage is to be a target voltage; and a determining unit configured to determine a clock number of the second clock signal corresponding to the turn-on time period of the pulse signal when the switching element is driven at the second frequency so that the turn-on time period of the pulse signal comes close to a target value, wherein the determining unit is configured to determine a pulse number of the first clock signal so that the turn-on time period of the pulse signal corresponding to the first clock signal comes close to the target value.

2. A power supply apparatus according to claim 1, wherein the determining unit is configured to determine the turn-on time period of the pulse signal to be within a predetermined range so that the turn-on time period of the pulse signal comes close to the target value.

3. A power supply apparatus according to claim 1, wherein the determining unit is configured to combine a predetermined number of pulse signals from a plurality of pulse signals retrieved with respect to different duties so that an average of turn-on time periods of the predetermined number of the pulse signals is the turn-on time periods in accordance with the, target value, and wherein the output unit is configured to output the predetermined number of pulse signals combined by the determining unit to the feedback unit.

4. A power supply apparatus according to claim 3, further comprising a first storage unit configured to store a combination of the predetermined number of pulse signals.

5. A power supply apparatus according to claim 1, further comprising a second storage unit configured to store the turn-on time period for outputting the predetermined voltage measured in advance, wherein the determining unit is configured to set a turn-on time period of the pulse signal at the turn-on time period stored in the second storage.

6. A power supply apparatus according to claim 1, further comprising a monitoring unit configured to monitor the output voltage, wherein the determining unit is configured to determine the turn-on time period of the pulse signal for outputting the predetermined voltage based on the output voltage monitored by the monitoring unit.

7. A power supply apparatus according to claim 1, wherein the output voltage is a lowest voltage among voltages output from the power supply apparatus when the ratio of the turn-on time period to the turn-on and turn-off time periods of the pulse signal is 0%, and is a highest voltage among the voltages output from the power supply apparatus when a ratio of the turn-on time period to the turn-on and turn-off time periods is 100%.

8. A power supply apparatus according to claim 1, wherein, when the generation unit stops generation of the clock signal, the ratio of the turn-on time period to the turn-on and turn-off time periods of the pulse signal is set to one of 0% and 100%.

9. An image forming apparatus comprising: an image forming unit configured to form an image on a recording material; and a power supply apparatus configured to supply electric power to the image forming apparatus, the power supply apparatus including: a transformer having a primary winding and a secondary winding; a switching element connected to the primary winding of the transformer, the switching element configured to drive so as to intermittently supply a current to the primary winding; a feedback unit configured to output a feedback signal according to an output voltage output from the secondary winding of the transformer; a control unit configured to control a driven state of the switching element based on the feedback signal output from the feedback unit, wherein the driven state is switched to drive the switching element in either one of a first frequency and a second frequency lower than the first frequency; a generation unit configured to generate a first clock signal corresponding to the first frequency and a second clock signal corresponding to the second frequency; an output unit connected to the feedback unit, the output unit configured to output a pulse signal for adjusting a value of the feedback signal, wherein the output unit controls a turn-on time period of the pulse signal based on either one of the first frequency and the second frequency so that the output voltage is to be a target voltage; and a determining unit configured to determine a clock number of the second clock signal corresponding to the turn-on time period of the pulse signal when the switching element is driven at the second frequency so that the turn-on time period of the pulse signal comes close to a target value, wherein the determining unit is configured to determine a pulse number of the first clock signal so that the turn-on time period of the pulse signal corresponding to the first clock signal comes close to the target value.

* * * * *